United States Patent [19]

Perez-Ruiz et al.

[11] Patent Number: 4,977,299
[45] Date of Patent: Dec. 11, 1990

[54] DOUBLE ACTION SWITCH

[75] Inventors: José-Maria Perez-Ruiz, Barcelona; Andres Mendoza-Mendoza, Hospitalet de Llobregat, both of Spain

[73] Assignee: Crouzet (Société Anonyme francaise), Montrouge, France

[21] Appl. No.: 371,790

[22] Filed: Jun. 27, 1989

[30] Foreign Application Priority Data

Jun. 28, 1988 [FR] France .................................. 88 08793

[51] Int. Cl.$^5$ .............................................. H01H 9/20
[52] U.S. Cl. ................................................... 200/5B
[58] Field of Search ............................... 200/5 B–5 E, 200/518, 523; 379/422–428

[56] References Cited

U.S. PATENT DOCUMENTS 3,396,247 8/1968 Rankin .................................. 200/5 B
4,701,578 10/1987 Keranen et al. ..................... 200/5 B

FOREIGN PATENT DOCUMENTS 0059331 9/1982 European Pat. Off. .
2146660 3/1973 Fed. Rep. of Germany .
2830661 1/1980 Fed. Rep. of Germany .
3529652 2/1987 Fed. Rep. of Germany .

Primary Examiner—J. R. Scott
Attorney, Agent, or Firm—Lowe, Price, LeBlanc, Becker & Shur

[57] ABSTRACT

A double interaction switch has a case in which a single block of contactors is controlled by two levers; namely, one monostable lever and one bistable lever. The bistable lever may be locked in one of its two stable positions. When the bistable lever is so locked, the monostable lever may be moved, and actuation of the bistable lever thereafter causes it to return to its unlocked position. When the monostable lever comes back to its rest position, with the bistable lever initially locked, the bistable lever comes back to its rest position. The bistable lever is lockable by means of a rod which may pivot under the action of a labyrinth, provided on the lever. The switch is suitable for use with "hands free" telephone receiver sets.

6 Claims, 3 Drawing Sheets

DOUBLE ACTION SWITCH

FIELD OF THE INVENTION

The present invention relates to electric switching devices for telephone receiver sets, and particularly those receiver sets with so-called "hands free" use, for which the user does not need to pick up the telephone handset in order to speak with his correspondent.

BACKGROUND OF THE PRIOR ART

In a telephone receiver set, the communication is generally obtained through a twin wire telephone line.

When the telephone receiver set is in the waiting or rest position, the twin wire line is connected to the call warning device, generally a bell.

Upon a telephone call actuating the warning device, the user takes off the telephone handset and a switch disconnects the telephone line from the warning device and connects it to communication members, formed conventionally of a microphone and an earphone. Some telephone receiver sets comprise a device enabling the user to converse with his correspondent without having to take off the telephone handset. Such receivers, commonly called "hands free" sets, comprise a bistable switch which, at the time of reception of the telephone call, disconnects the telephone line from the warning device, generally under the action of a push-button operated by the user, and connects it to the amplified communication members. Such members include a microphone and a loudspeaker, and enable the user to converse while keeping both his hands free or, optionally, enabling a conversation to take place with more than one party. At the end of the conversation, the telephone line is disconnected from the communication members and is connected again to the warning device by a further actuation of the bistable switch.

There also exist on the market telephone receiver sets in which the "hands free" function is combined with the conventional function of picking up—replacing the telephone handset. The act of replacing the telephone handset may thus operate the "hands free" switch by actuating its control push-button through complex mechanical linkages.

A switch of the above-mentioned type is already known from German Patent No. DE-A-2 830 661. However, it is large in size because its locking-unlocking means are disposed at least partially outside the case of the switch.

German Patent No. DE-A-3 529 652 also describes a similar switch, but the mechanical construction of the switch is complicated, unreliable and expensive.

The present invention aims then at improving on these switches of the prior art and provides a compact double interaction switch, of simple reliable and economic constructions.

SUMMARY OF THE INVENTION

A preferred embodiment of the present invention provides a switch in which a locking means comprises a rod provided for cooperating with means associated with the bistable lever for locking it in a selected position, the rod being mounted for pivoting under the action of means for unlocking a bistable lever and with means for unlocking a monostable lever and thus freeing the means locking the rod from the means associated with the bistable lever.

The monostable and bistable levers are movable along parallel axes and the locking rod is mounted for pivoting in a plane parallel to the axes of movement of the levers.

Preferably, the rod has a movable pin and the bistable lever an associated V projection, the monostable lever has a projection disposed so as to cause a curved end of the locking rod to pivot, and the bistable lever comprises a labyrinth with the walls of which the pin of the rod may cooperate so as to cause the rod to pivot, the projection being disposed inside the labyrinth.

BRIEF DESCRIPTION OF THE DRAWINGS

The invention will be better understood from the following description of two preferred embodiments of the switch of the invention, more especially intended for equipping a telephone receiver set provided with a warning bell, a telephone handset and its conventional lift off-replacement system, an amplifier with its microphone and its loudspeaker and its "hands free" control, with reference to the accompanying drawings in which.

DESCRIPTION OF THE PREFERRED EMBODIMENTS

Figure 2:
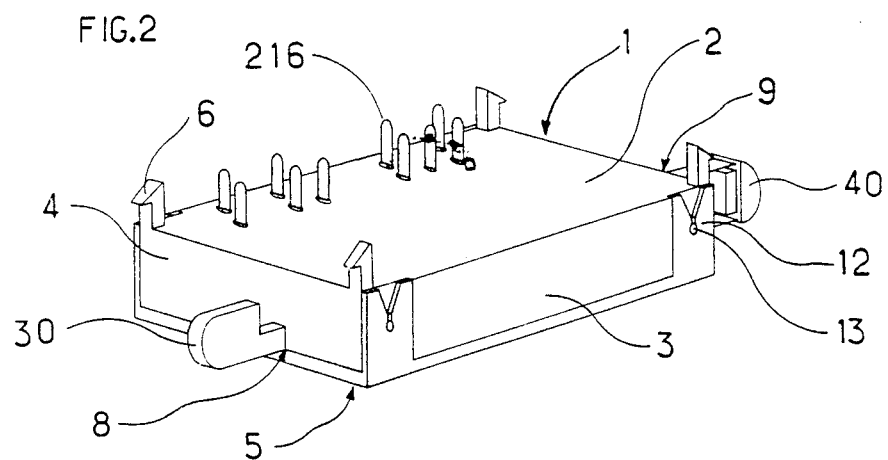
FIG. 2 shows a perspective view of the switch of FIG. 1.

As illustrated upside down in FIG. 2, the switch of the invention comprises a generally parallelepiped-shaped case 1, preferably made from a rigid plastic material, comprising a bottom 2, two large lateral sides 3 and two small lateral sides 4 and a lid 5. Each small edge of the sides of the case is extended by a foot 6 comprising at the end a substantially triangular spur intended for clipping the switch to a support, generally a printed circuit board of the telephone receiver. The bottom 2 is pierced by the number of holes required for passing therethrough extensions of various contact blades to enable connection by soldering to the printed circuit. Each of the small sides 4 is formed with an opening 8, 9 for passing therethrough of monostable control means 30 and bistable control means 40 for the contact blades. Monostable means 30 is for transmitting control of the handset and bistable means 40 is connected, for example, to a pusher providing a "hands free" function. Lid 5 is fixed by clipping of four lugs 12 provided thereon to four pivots 13 provided on the large sides 3 of the case close to the connecting edges with the small sides 4.

Figure 1A:
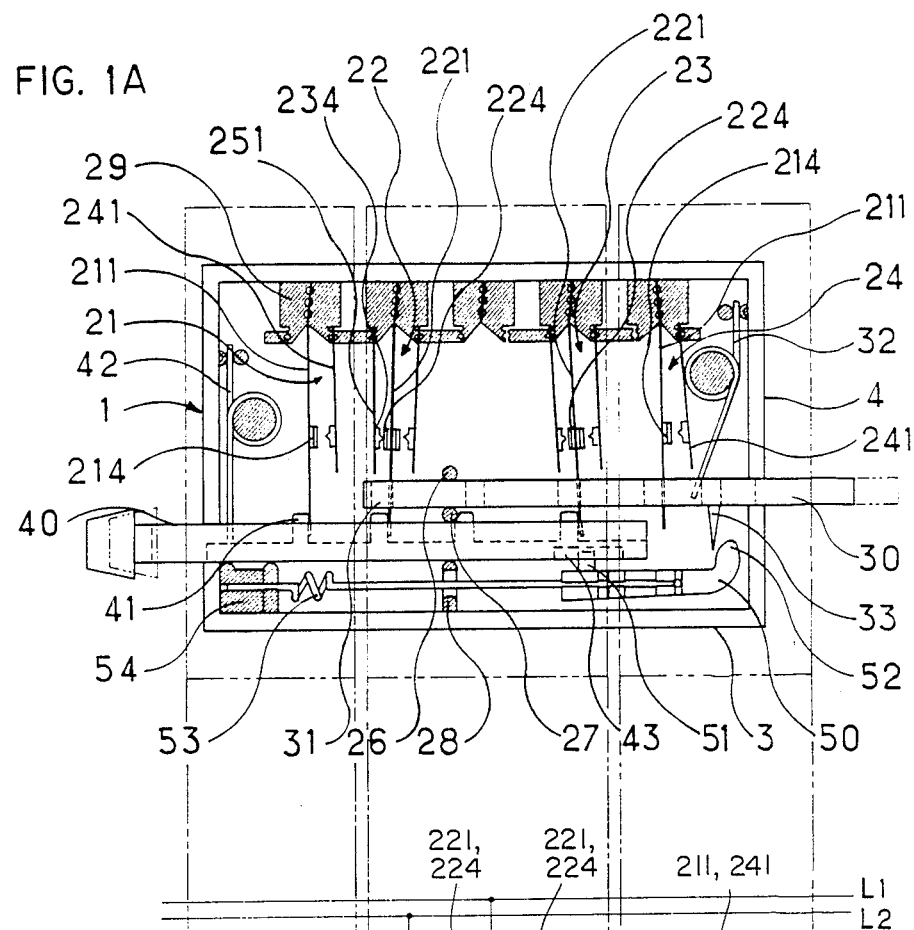
FIGS. 1A and 1B illustrate, respectively, a sectional view of a first embodiment of the switch of the invention, in combination with the corresponding electric block diagram.
Figure 1B:
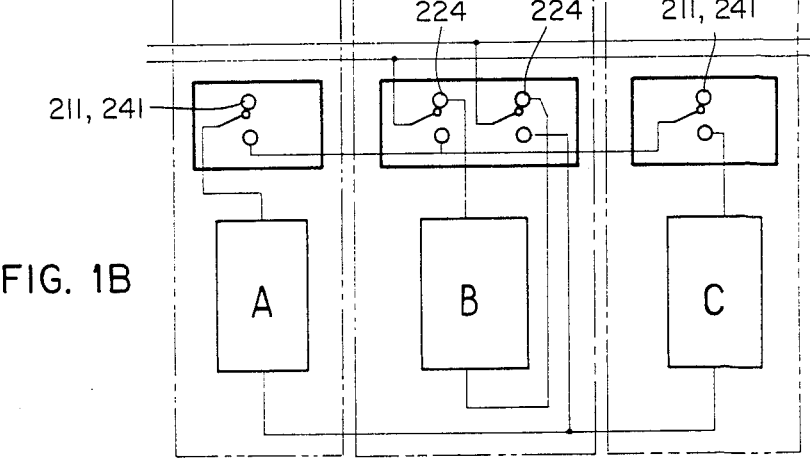

Referring now to FIG. 1A, the inside of case 1 comprises a sing block of electric contact means, e.g., switches 21, 22, 23, 24; monostable and bistable means for example, levers 30, 40 for operating these switches in a device for mutual locking-unlocking of the operating means; and means 32, 42 for returning the levers to their normal respective positions.

The electric contact means in the preferred embodiment comprises, in planes parallel to the small sides 4 of case 1, a single contact 20, two change-over contacts 22, 23, and a single contact 24.

Each single contact 21, 24 (see FIG. 1A) comprises a first flexible metal blade 211, in the form of a fork with two parallel legs 212, 213. On each fork, in a substantially median position, is fixed, e.g., by soldering, a contact stud 214, preferably stamped from a shaped metal sheet. The base 215 of the fork is held in position by being nipped between protuberances 29 formed to be projecting from the bottom of the case.

Figures 3A, 3B:
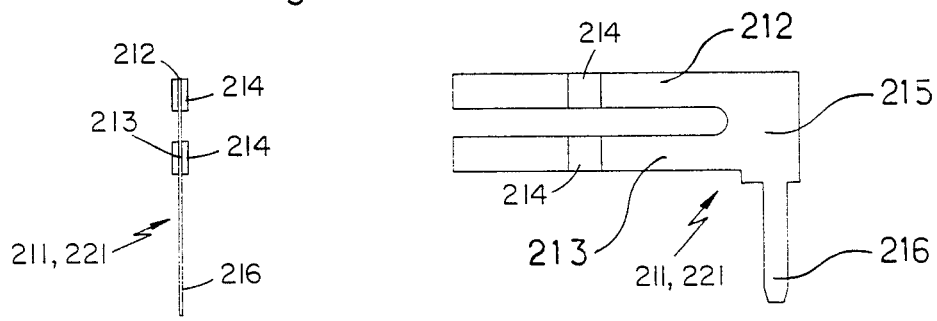
FIGS. 3A and 3B respectively show end and side elevation views of a first contact blade embodiment.

As best seen in FIGS. 3A and 3B extension 216 of base 215 extends perpendicularly to legs 212, 213, and it is engaged in a hole formed therefor in the bottom 2 of the case, between the protuberances 29, so that it can be soldered to the printed circuit supporting the switch.

Figures 4A, 4B:
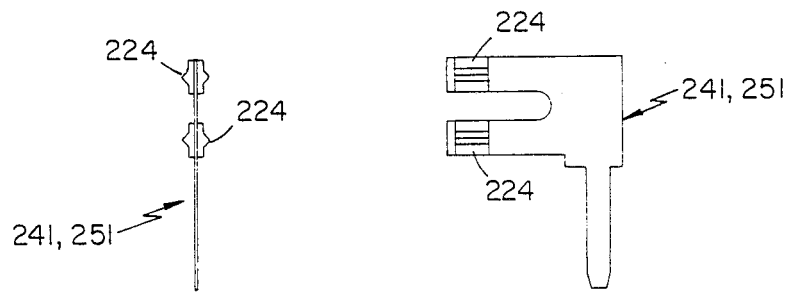
FIGS. 4A and 4B respectively show end and side elevation views of a second contact blade embodiment.

Each single contact 21, 24 noting representative FIGS. 4A and 4B also comprises a second metal flexible blade 241, generally similar to the first blade 211, but having shorter parallel legs and comprising contact studs disposed substantially at the end of the legs opposite the studs of blades 211 to provide electric contact when placed in mutual abutment therewith.

Each of the two change-over contacts 22, 23 comprises a flexible blade 221, similar to the blades 211 of the single contacts 21, 24. Each of the blades 221 has a leg provided with a contact stud 224 symmetrical with stud 214 with respect to the plane of the leg. Each change-over contact also comprises a flexible blade 241, identical to the flexible blade 211 of the single contacts, and a similar flexible blade 251. Each leg comprises an electric contact stud 234 situated in a symmetrical position with respect to the plane of the blade.

The first control means; namely, the monostable lever 30, comprises a substantially parallelepiped-shaped very elongate lever with a substantially square cross-section, mounted for movement in translation along an axis parallel to the large sides 3 of the case 1, guided by two studs 26, 27 projecting from the bottom 2 of the case 1 and passing through one of the small sides 4 of case 1.

Monostable lever 30, as best seen in FIG. 1A, comprises protuberances 31 in the form of teeth orthogonal to the face of lever 30 turned towards the bottom of the case. The ends of protuberances 31 bear on the bottom so as to hold lever 30 in position in its plane of movement. The protuberances cooperate by contact with the ends of contact blades 211, 221 of contacts 22, 23, 24 so as to cause opening or closing of the respective contacts during translational movement of lever 30.

A resilient return means, spring 32, is provided to bias lever 309 toward its stable position as shown in FIG. 1A to a position extended to the right, by applying a force to a projection 33 provided on lever 30. Projection 33 is in abutment against the internal wall of side 3 of the case into side 4 of which lever 30 passes.

A second control means comprises elongate bistable lever 40, is mounted for translational movement along an axis parallel to the long sides 3 of case 1, in a plane close to lid 5, guided by two studs 27, 28. Control lever 40 through the other of the small sides 4 of case 1. Control levers 30 and 40 pass through apertures provided for each lever in opposite sides 4 of the case.

Lever 40 comprises four stops (best seen in FIG. 1A) 41 in the form of crenellations rising over the whole width of lever 40 in planes parallel to each other and orthogonal to the axis of translation of lever 40. Three of the four stops 41 cooperate with the ends of the large contact blades 21, 22, 23 to provided opening or closing of these contacts during the translational movement of lever 40, as will be described further on. A fourth stop 41 cooperates by contact with stud 27 to limit travel in the extended position of lever 40. A resilient return means, a spring 42, returns the lever 40 to its extended position, one of its two stable positions.

Figure 5:
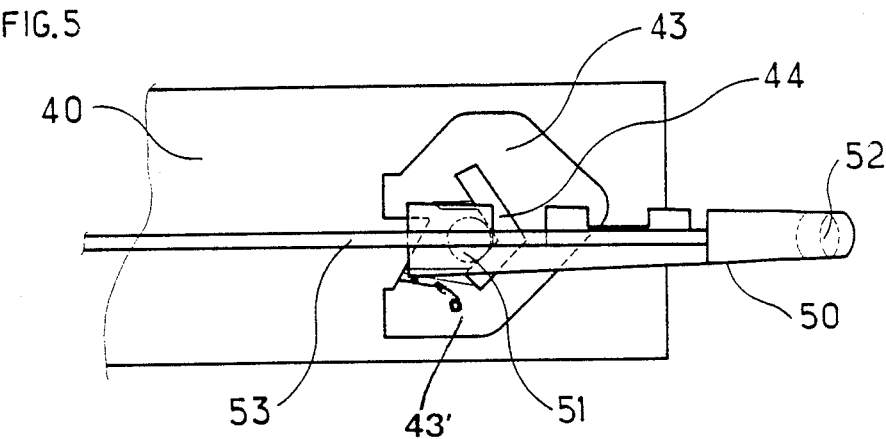
FIG. 5 shows a partial view of the mechanism for the mutual locking-unlocking of the handset control and of the "hands free" control.

An imprint 43, best seen in FIG. 5, is provided in the form of a labyrinth in the plane of the bottom of lever 40 substantially towards its end disposed inside case 1.

The labyrinth 43 comprises substantially in a median position a locking projection or ramp 44 in the form of a V with asymmetric legs. The contours of this projection 44 and the walls of the labyrinth cooperate by contact with a pin 41 of the lever 40 providing mutual locking-unlocking of the control levers 30, 40.

The locking-unlocking member 50 is in the form of a lever having an end 52 which is curved in the form of a beak with a cam profile. The lever end 52 cooperates with the projection 33 of lever 30 by contact therewith.

A pin 51 is provided to project perpendicular to the pivoting plane of member 50, and is held engaged in labyrinth 43 by the action of a semi-rigid resilient rod 53 that is force fitted in an internal protuberance 54 of case 1, as best seen in FIG. 1A.

Rod 53 allows lever 50 to move in a plane parallel to the bottom 2 of case 1 through an angle having as an apex the fixing point of rod 53, but does not allow translational movement of lever 50 along its longitudinal axis. Referring to FIG. 1A, lever 30, i.e., lever 50, the monostable control means associated with the telephone receiver set, is shown in the retracted position The handset then is on its cradle, and the lever 40, 1A the bistable control means associated with the "hands free" function, is shown in an extended position which corresponds to waiting for an incoming telephone call. Under these circumstances contact 21 connects the telephone line $L_1$, $L_2$ to the electronic circuit A of the microphone and of the loudspeaker of the "hands free" position, contact 24 connected the telephone line to circuit C of the telephone handset, the two change-over contacts 22, 23 switch the telephone line of the circuit of the warning bell B to at least one of the conversation circuits A or C used.

From the arrangement shown in FIG. 1A, with the telephone waiting for a call, the following sequences may occur: if the bell B rings and the user picks up the handset, lever 30 passes from the extended position, contact 24 closes, contacts 22, 23 change over, and the conversation can take place.

If the user had used the "hands free" option, by operating lever 40 to move it towards its retracted position, lever 40 would close contact 21 and change over contacts 22, 23 and the ramp or V-shaped projection 44 would come behind pin 51 coming between the two legs of the V-shaped projection 44. The user can thus use both the handset C and the "hands free" device A.

When the "hands free" lever 40 is in the retracted position, locked by its ramp 44 on pin 51, a further pressure thereon causes pin 51 to travel over labyrinth 43 and particularly its ramp 43, (see FIG. 5) which causes rod 53 to pivot and unlocks lever 40 which comes back to its extended position. This retracted position is the second stable position of bistable lever 40.

Similarly, when the "hands free" lever 40 is in its retracted position and when lever 30 is in its extended position, with the handset off, replacing the handset causes projection 33 to operate by contact with end 52 which pivots slightly in a plane parallel to that of bottom 2 of case 1. Pin 51 is then released from projection 44 and this releases lever 40 to its unlocked position, namely the extended position.

The levers of the hereinabove described switch can act together or separately on all or part of the same contacts. This enables the provision of electrical functions which are common or separate, and also a reduction in the number contacts needed for achieving all desired functions.

The invention is not limited to the above-described switch. In particular, the number of contacts may be modified so as to adapt the device to the requirements each telephone receiver set. The switch of the invention makes it possible to construct a compact electromechanical unit combining the functions of two separate switching blocks. This allows a facility of implementation details of which are left to the constructor of telephone receiver sets using this invention. Thus, in particular, the translational movement of the control means, in a plane parallel to that of the printed circuit on which the switch is mounted, does not require the precise positioning of the switch under the "hands free" pusher when the available space is not sufficient. Further, the return springs of the control levers 30 and 40 are incorporated in the switch, as is the device for the mutual locking-unlocking of these means.

Another advantage of the invention resides in the quality of the electric contacts. They may in fact be coated with precious material, such as silver or gold, and be formed on two parallel studs. The simultaneity or their movements not being strictly obtained, the first of the two studs which closes, and which will therefore be the last to open, absorbs all the current load with the associated risks, particularly wear, sparking, charring, and the second of the two studs which closes, which will therefore be the first to open, provides a high contact quality. Another advantage of the switch of this invention is that of being able to be readily adapted, for example by changing lid 5, to the mechanical or space requirements of different telephone receiver sets on the market.

Figure 6A:
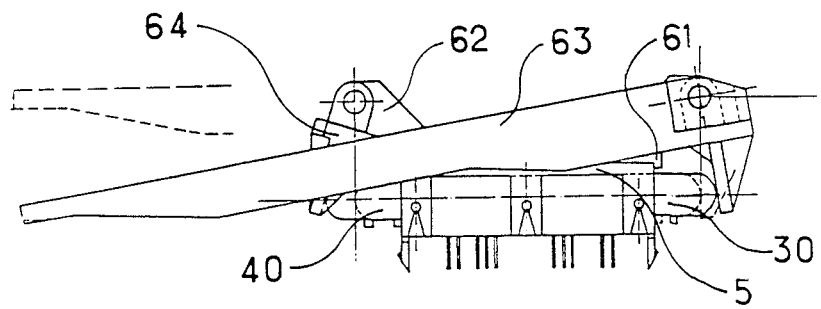
FIGS. 6A and 6B show two orthogonal views of a variant of the switch, equipped with levers connecting with the operating device of a telephone receiver set.
Figure 6B:
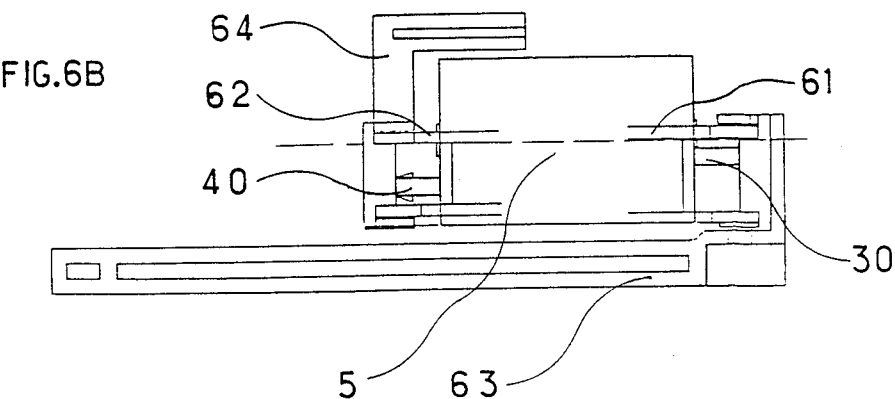

FIGS. 6A and 6B illustrate a structural variant of the switch of the invention, with a lid which comprises two forks 61, 62, on each of which is hinged a lever. Of these, lever 63 cooperates with the monostable control lever 30 to move it in translation. With the pick up-set down device, the other lever 64 cooperating with the bistable control lever 40 to move it in translation and with the "hands free" device. In this case, lid 5 comprises six fixing lugs, instead of four as described above, to increase its rigidity.

Accordingly, just by changing the upper lid one can obtain bearing and hinging points for the levers which transmit the operating movements from external acting points of the telephone set (handset and hands free key).

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

We claim:

1. A double interaction switch, comprising:

a casing; and a plurality of contacts disposed in the casing to be controllable by a monostable lever having one stable position and a bistable lever having two stable positions, each lever being movable from a first position to a second position with respect to the casing by respective first and second actuating members, the bistable lever being formed to be locked in its second position by locking means, the monostable lever being movable to its second position when the bistable lever is also in its second position, actuation by the second actuating member of the bistable lever, when the lever is in its second position, causing return of the bistable lever to its first position, and the return, under the action of the first actuating member, of the monostable lever from its second position to its first position, when the bistable lever is in its second position, causing return of the bistable lever to its first position, wherein said locking means comprises a locking rod cooperating with locking rod engaging means associated with the bistable lever for locking the bistable lever in its second position, the locking rod being mounted in the casing for pivoting therein for action of means for unlocking the bistable lever and thereby freeing the means locking the locking rod from the associated means for locking the bistable lever.

2. The switch as claimed in claim 1, wherein:

said monostable and bistable levers are each movable along parallel axes; and the locking rod is mounted in said casing for pivoting in a plane parallel to the axes of movement of the levers.

3. The switch as claimed in claim 1, wherein:

said locking rod is provided with a locking pin; and the bistable lever has an associated V-shaped projection located to selectively engage said locking pin.

4. The switch as claimed in claim 1, wherein:

said locking rod is formed to have a curved end; and said monostable lever has a projection disposed to cooperate with said curved end of the locking rod to cause the locking rod to pivot in the casing.

5. The switch as claimed in claim 3, wherein:

said means for locking said bistable lever comprises a labyrinth having walls with which the pin of the locking rod cooperates so as to cause the locking rod to pivot within the casing.

6. The switch as claimed in claim 5, wherein:

said projection is disposed inside the labyrinth.

* * * * *